Figure 1:
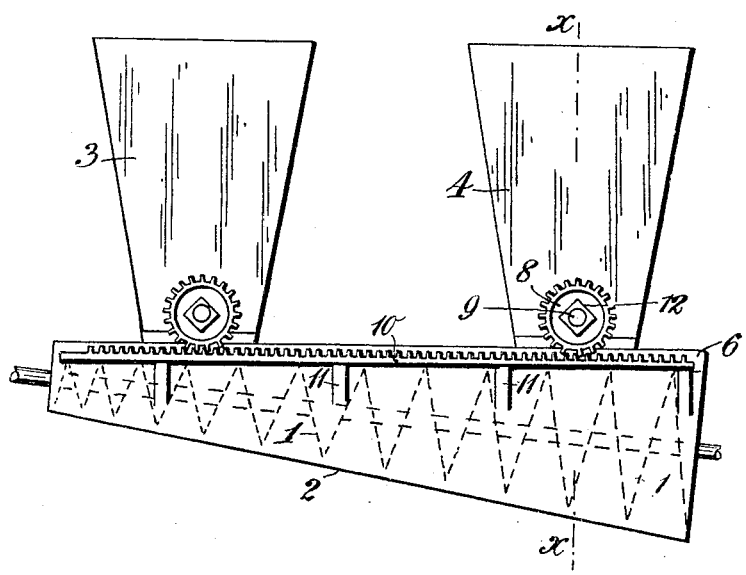

No. 804,022. PATENTED NOV. 7, 1905.
T. H. D. MAY.
APPARATUS FOR MIXING SUBSTANCES TOGETHER IN REGULAR PROPORTIONS.
APPLICATION FILED JUNE 9, 1904.

Witnesses:
James L. Norris, Jr.
C. D. Kesler.

Inventor
Thomas H. D. May
By James L. Norris.
Attys.

UNITED STATES PATENT OFFICE.

THOMAS HUGHES DELABERE MAY, OF BATH, ENGLAND.

APPARATUS FOR MIXING SUBSTANCES TOGETHER IN REGULAR PROPORTIONS.

No. 804,022. Specification of Letters Patent. Patented Nov. 7, 1905.

Application filed June 9, 1904. Serial No. 211,822.

*To all whom it may concern:*

Be it known that I, THOMAS HUGHES DELABERE MAY, mining engineer, a subject of the King of Great Britain, residing at 2 Springfield, Bath, in the county of Somerset, England, have invented certain new and useful Improvements in or Relating to Apparatus for Mixing Substances Together in Regular Proportions, of which the following is a specification.

This invention has reference to apparatus for mixing together in regular proportions substances—such, for instance, as different kinds of clay or granular or analogous materials—that is to say, any materials which are in a convenient state to be fed from a hopper or bin by a screw or other conveyer.

The invention relates more particularly to automatic mixers or apportioners in which a screw conveyer or the like of graduated or varying capacity is arranged to withdraw the materials continuously from a set of hoppers and to discharge them in a condition in which they are mixed together in the proper proportions, so that while they can, if required, be mixed still more intimately afterward there shall be no danger of the proportions in the finished mixture being other than those required.

The object of the present invention is to improve and simplify the construction of such mixing and apportioning apparatus.

According to the invention the screw conveyer is in the form of a long tapering or conical worm in order to vary its holding capacity at different parts, and the hoppers are arranged in conjunction with it, so that they can be moved along until the proper position is found. In other words, as the diameter, and therefore the effectiveness, of capacity of the screw or conveyer varies the amount withdrawn from each hopper or bin can be regulated by moving the hopper or the screw relatively to each other until a point is reached at which any desired rate of withdrawal is obtained. Hence the character or percentage composition of the finished mixture can be adjusted very conveniently and with great accuracy. The movement of the hopper may be effected by mounting it on rollers and operating it by a rack-and-pinion arrangement or otherwise.

To enable evenness and regularity of the action to be maintained, suitably-arranged baffles or supporting-flaps may be provided at different levels in the hoppers or bins to take off the pressure of the contents, and thus obviate any liability to the rate of withdrawal varying in accordance with the height of the materials in the bins. These baffles or flaps might be hinged and inclined or set in opposite directions and be arranged so that their slope or inclination can be adjusted to suit different materials.

In order that the invention may be more readily understood, reference will now be had to the accompanying drawings, in which—

Figure 2:
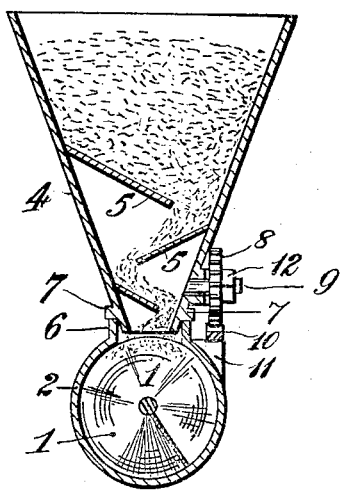

Figure 1 is a side view of an arrangement of a pair of hoppers or bins combined with a tapering or conical conveyer and provided with a convenient traversing or adjusting mechanism. Fig. 2 is a vertical section of one of the said hoppers, taken on the line $xx$, Fig. 1.

1 is the worm or screw conveyer, which is made tapering as a convenient means of obtaining a variation or graduation in the capacity from one end to the other, while keeping the edge next to the hoppers straight, so that the adjustment can be effected by a sliding movement.

2 is a correspondingly-shaped circular trough, shell, or casing in which the worm is arranged to work in the manner usual in screw conveyers.

3 and 4 are two hoppers or bins which serve to contain the materials to be mixed together, there being one hopper for each kind of material.

5 represents inclined baffles or supporting flaps or shelves which are provided in the hoppers to enable the materials to slide down to the conveyer without, however, throwing the weight onto the latter. By this means, as above stated, the height of the materials does not interfere to any appreciable extent with the rate of feed.

6 is a lip or flange formed along each of the top edges of the trough, so that the mouth of the hoppers can fit down into the trough to prevent any danger of the materials being split. Besides this, however, the two flanges form rests and guides for a pair of slides or projections 7 on the hopper, which serve, in fact, as supports or carriers for the latter.

Any suitable adjusting arrangement may be provided for moving the hoppers to and fro, or the movement may simply be effected by hand in some cases. A convenient arrangement, however, is shown in the drawings, wherein 8 is a pinion mounted on a stud 9, fixed on the hopper, and 10 is a rack fixed on brackets 11 on the side of the trough or casing 2. The boss of the pinion is provided with a square extremity 12, as shown, onto which a key or handle may be fitted when it is required to turn it, so as to force or traverse the hopper to the right or the left to alter the rate of feed.

The action of the apparatus illustrated is as follows: The screw or conveyer 1 is turned in such a direction as to feed the material toward the right from its narrower to its wider end. Beneath the first hopper 3 the screw will therefore be filled with a certain quantity of material, depending on its diameter at this part. Supposing that 3 were the only hopper, then by the time the material arrived at the wider part of the conveyer the latter would only be partially filled, owing, of course, to its diameter, and therefore its capacity, being so much increased. The second hopper $d$, however, supplies the deficiency, a further quantity of material being withdrawn from it, according to the difference in capacity below it and below the first hopper. These withdrawals go on simultaneously at both hoppers, and the materials pass out together at the wider end of the conveyer. If it should be found that the proportions are not quite correct, this is easily adjusted by moving one or other, or both, of the hoppers along the conveyer in the corresponding direction, a movement to the left decreasing the proportion of material withdrawn from the hopper and a movement to the right serving to increase it. The action is the same for three or more hoppers.

When the proper positions have been ascertained for any particular materials, they may be indicated by index-marks or a scale on or near the flange 6.

The rate of action may be varied in any convenient way without departing from the nature of the invention.

I make no claim in this application to the construction disclosed in my companion application, Serial No. 206,948, filed May 7, 1904, and wherein a materially different arrangement and combination of elements are set forth.

What I claim, and desire to secure by Letters Patent of the United States, is—

1. An apparatus for automatically proportioning and mixing substances together, comprising a conveyer whose capacity is gradually increased from one end to the other, hoppers for holding the different materials and delivering them to the conveyer, and means for adjusting the hoppers longitudinally of said conveyer relatively to the conveyer so as to vary the particular relative amounts withdrawn from each hopper, substantially as described.

2. In an apparatus for mixing substances in regular proportions, the combination of hoppers for the different materials, a tapering screw conveyer, a casing therefor, and means for adjusting the position of the hoppers along the screw conveyer to vary the relative amounts of material which the latter withdraws from each hopper, substantially as described.

3. In an apparatus for mixing different materials in regular proportions, the combination of a tapering conveyer, a trough or casing therefor, hoppers for the different materials, supported by said trough and a rack and pinion for traversing the hoppers along the trough substantially as described.

4. In an apparatus for mixing different kinds of material together automatically, the combination of a delivery apparatus for each different kind of material, a conveyer whose capacity increases from one point to another, and means for bringing the delivery apparatus opposite different points in the conveyer and thus altering the proportions of material withdrawn by said conveyer, substantially as described.

In testimony whereof I have hereunto set my hand, in presence of two subscribing witnesses, this 26th day of May, 1904.

THOMAS HUGHES DELABERE MAY.

Witnesses:
C. BARNARD BURDON,
HERBERT D JAMESON.